July 20, 1926.　　　　　C. L. McVOY　　　　　1,592,894

LUGGAGE CARRIER FOR MOTOR VEHICLES

Filed Nov. 17, 1925

Inventor
Charles L. McVoy

By E. H. Bond
Attorney

Patented July 20, 1926.

1,592,894

UNITED STATES PATENT OFFICE.

CHARLES L. McVOY, OF PENSACOLA, FLORIDA.

LUGGAGE CARRIER FOR MOTOR VEHICLES.

Application filed November 17, 1925. Serial No. 69,642.

This invention relates to certain new and useful improvements in boxes or receptacles attachable to the bumper or springs, or to the bumper and springs of a motor vehicle, for the carrying of luggage or any desired articles, and it has for its objects among others to provide a simple, yet efficient attachment readily applied and yet firm in its support when in position, and which shall be relatively inexpensive of manufacture, and yet strong and durable.

The invention has for a further object to provide for the interchangeability of the box and a pan adapted to carry ice, the two being designed to be supported in the same manner and applied to the bumper or spring, or bumper and spring in the same way.

The present improvement embodies few parts, those readily assembled and the box or ice holder being readily attachable and detachable.

Other objects and advantages of the invention will hereinafter appear, and the novel features thereof will be specifically defined by the appended claims.

The invention, in its preferred form, is clearly illustrated in the accompanying drawings, which with the numerals of reference marked thereon, form a part of this specification, and in which—

Like numerals of reference indicate like parts throughout the several views.

Referring to the drawings—

Figure 1:
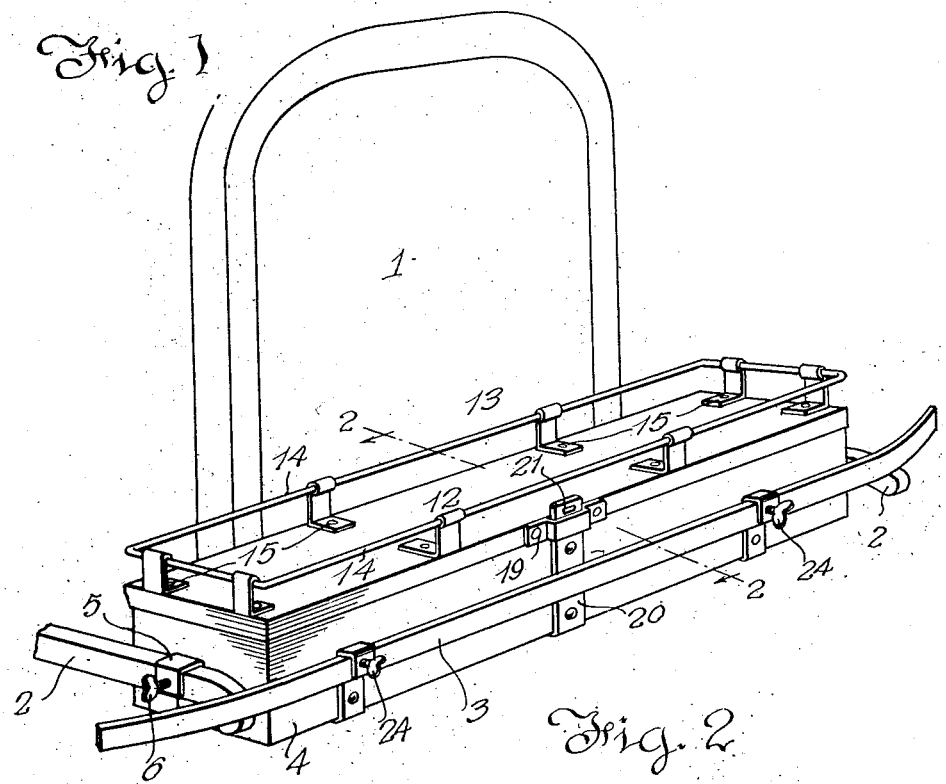
Figure 1 is a perspective view showing my improvement applied to the bumper and springs of a motor vehicle.

1 designates the radiator and 2 2 the front springs of a motor vehicle of any well known type, it being designed to so modify the hangers as to adapt the attachment to the different types of motor vehicles without any material change.

3 is the bumper. The supporting means of the box or other receptacle 4 will be of a form applicable to the form of springs and bumper of the particular type of car to which the said receptacle is to be applied.

In the present instance the box or receptacle 4 is of rectangular form and of a length to just fit in between the springs and between the bumper and the radiator. The size and shape of the box may vary as circumstances may require. It is provided at the ends with hangers 5 adapted to fit over the springs, and preferably provided with thumb screws 6 by means of which the hangers may be securely affixed in position over the springs as seen at the left in Figure 1. These hangers may be of any suitable form adapted to the purpose and may be formed on the ends of a metallic strip 7 which extends the whole length of the box 4 as seen in Figure 4, being extended beneath the bottom of the box and secured thereto in any suitable manner, the hangers being rigid with the opposite ends of the said strip as seen in said Figure 4, or the hangers may be each formed independently of the other and attached upon the under side of the box at opposite ends, as seen in Figure 3 in connection with the ice carrier, soon to be described.

Figure 3:
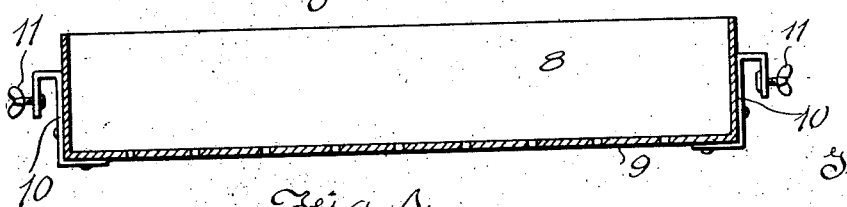
Figure 3 is a vertical longitudinal section of an ice holder designed to be applied to the springs, or to the bumper and springs as may be desired.
Figure 4:
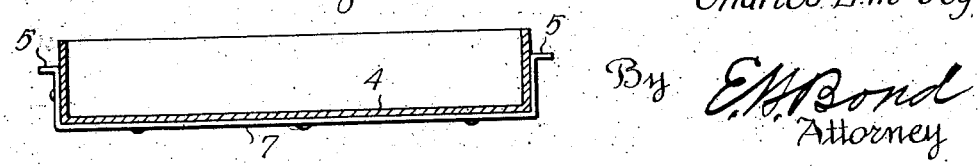
Figure 4 is a vertical longitudinal section of the box of Figure 1, broken away.

This ice carrier or pan 8 in general contour is substantially the same as the box 4 but has a perforated bottom 9 as seen in Figure 3, the hangers 10 being formed each independently of the other and attached to the under side and ends of the box in any suitable manner, as seen in Figure 3. They are adapted to engage over the springs and are provided with thumb screws or the like 11 by means of which the hangers may be securely held in position after having been engaged over the springs, as will be readily understood from Figure 1, the ice pan being designed to be detachably and interchangeably employed, that is, the box 4 may be readily removed and the ice pan substituted, or vice versa.

The ice pan may, in some instances, be removably supported beneath the box 4 if desired.

The box 4 is provided with a movable top portion 12 having upon the top thereof a rack or the like 13 which in the present instance is shown as of a surrounding rail 14 supported from the top 12, which forms the cover to the box 4, by means of the supports 15 attached to the top in any suitable manner as seen in Figure 1. This forms a convenient holder for rugs, blankets, or the various articles that it may be desired to carry along on the trip.

Figure 2:
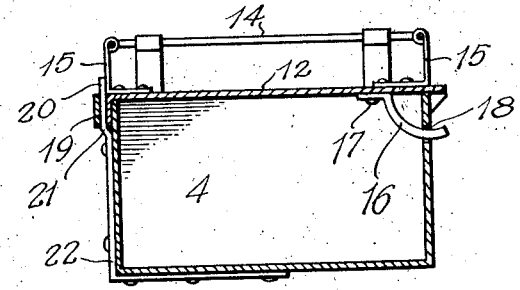
Figure 2 is a vertical cross section as on the line 2—2 of Figure 1.

The top portion 12 which forms the cover to the box is movably connected with the said box; in the present instance by means of the curved members 16 attached as at 17 to the under side of the top 12 and working loosely through holes 18 in the back of the box as seen in Figure 2. The curved members 16, working through the said holes, form a sort of hinge upon which the top may be moved to gain access to the interior of the box, as will be readily understood.

The top portion 12 may be held in closed position in any suitable position. In the present instance I have chosen to show the front of the said top as provided with a loop member secured thereto in any suitable manner and on the front of the box 4 is an upstanding member 20 having an offset as at 21, see Figure 2, which upstanding member is designed to enter the loop 19 as seen in Figures 1 and 2, being provided with an opening 21 through which may be applied any suitable form of locking or fastening means, not herein shown. The upstanding member 20 is formed on the angular member 22 secured to the vertical side and the bottom of the box in any suitable way, as seen in Figure 2 and serving to strengthen the box. The bottom of the box is further strengthened by the member 17 as will be readily understood.

23 are hangers secured to the bottom of the box 4 at the front as seen in Figure 1 and adapted to engage over the bumper as seen in the said figure, being provided, preferably, with thumb screws or the like 23 for an obvious purpose.

The mode of use will be apparent. The box, as well as the ice pan, may be supported solely from the springs or from the bumper, or from both, preferably the latter, and can be applied or detached in a short space of time.

Modifications in detail may be resorted to without departing from the spirit of the invention or sacrificing any of its advantages.

What is claimed as new is:—

1. A receptacle for the purpose described, having a longitudinally extended member attached to its under side and having its ends upturned and formed into hangers to engage over the front springs of a vehicle and hooked members extended under the side of the receptacle to engage over the bumper, said hangers and hooked member being readily removable from the springs and bumper.

2. In a device of the character described, a receptacle having hangers for its support over the front springs and the bumper of a motor vehicle, and a top provided with curved members rigidly attached to the under side of the top and working loosely through openings in the side of the receptacle.

In testimony whereof I affix my signature.

CHARLES L. McVOY.